United States Patent
Woo et al.

(10) Patent No.: US 9,371,076 B2
(45) Date of Patent: Jun. 21, 2016

(54) METHOD AND APPARATUS FOR POSITIONING A VEHICLE

(71) Applicant: GENERAL ELECTRIC COMPANY, Schenectady, NY (US)

(72) Inventors: Derek Kevin Woo, Melbourne, FL (US); Carlos Sabino Paulino, Melbourne, FL (US); Ralph Haddock, III, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/602,334

(22) Filed: Jan. 22, 2015

(65) Prior Publication Data

US 2015/0134147 A1    May 14, 2015

Related U.S. Application Data

(63) Continuation-in-part of application No. 13/617,897, filed on Sep. 14, 2012, now Pat. No. 8,942,869, and a continuation-in-part of application No. 13/618,093, filed on Sep. 14, 2012, now abandoned, and a continuation-in-part of application No. 14/180,920, filed on Feb. 14, 2014, now Pat. No. 9,145,863.

(60) Provisional application No. 61/790,873, filed on Mar. 15, 2013.

(51) Int. Cl.
| | |
|---|---|
| *B61C 17/12* | (2006.01) |
| *B61L 27/00* | (2006.01) |
| *B61L 3/12* | (2006.01) |
| *B61L 17/00* | (2006.01) |
| *B61L 15/00* | (2006.01) |

(52) U.S. Cl.
CPC ............... *B61C 17/12* (2013.01); *B61L 3/127* (2013.01); *B61L 17/00* (2013.01); *B61L 27/0077* (2013.01); *B61L 15/0027* (2013.01); *Y02T 30/10* (2013.01)

(58) Field of Classification Search
CPC .............................. B61C 17/12; B61L 27/00
USPC ........................ 701/19, 20, 2; 455/15; 246/4
See application file for complete search history.

(56) References Cited

U.S. PATENT DOCUMENTS

| | | | |
|---|---|---|---|
| 5,511,749 A | * | 4/1996 | Horst ...................... B61L 3/126 104/295 |
| 5,720,455 A | | 2/1998 | Kull et al. |

(Continued)

FOREIGN PATENT DOCUMENTS

| | | |
|---|---|---|
| WO | 9960735 | 11/1999 |
| WO | 2010039680 | 4/2010 |
| ZA | 0101708 | 8/2001 |

*Primary Examiner* — Tan Q Nguyen
(74) *Attorney, Agent, or Firm* — GE Global Patent Operation

(57) ABSTRACT

A method for remotely controlling a plurality of vehicles includes receiving at an external control system, under an indexing mode of operation, a first signal from off-board vehicle indexing equipment. The method further includes establishing in the external control system a positioning mode of operation in response to the first signal. Further, under the positioning mode of operation, and in response to actuation of an interface of the external control system, the method includes sending from the external control system a second signal to a first vehicle of the plurality of vehicles, the second signal comprising a first command to adjust a throttle setting of first vehicle and a second command to idle a throttle of at least one second vehicle of the plurality of vehicles.

23 Claims, 12 Drawing Sheets

(56) References Cited

U.S. PATENT DOCUMENTS

| | | | |
|---|---|---|---|
| 5,738,311 A | 4/1998 | Fernandez |
| 5,740,547 A | 4/1998 | Kull et al. |
| 5,785,392 A | 7/1998 | Hart |
| 5,813,635 A | 9/1998 | Fernandez |
| 5,820,226 A | 10/1998 | Hart |
| 5,833,325 A | 11/1998 | Hart |
| 5,927,822 A | 7/1999 | Hart |
| 5,934,764 A | 8/1999 | Dimsa et al. |
| 5,950,967 A | 9/1999 | Montgomery |
| 5,969,643 A | 10/1999 | Curtis |
| 5,978,718 A | 11/1999 | Kull |
| 5,986,577 A | 11/1999 | Bezos |
| 5,986,579 A | 11/1999 | Halvorson |
| 5,995,881 A | 11/1999 | Kull |
| 6,114,974 A | 9/2000 | Halvorson |
| 6,128,558 A | 10/2000 | Kernwein |
| 6,163,089 A | 12/2000 | Kull |
| 6,216,095 B1 | 4/2001 | Glista |
| 6,275,165 B1 | 8/2001 | Bezos |
| 6,322,025 B1 | 11/2001 | Colbert et al. |
| 6,360,998 B1 | 3/2002 | Halvorson et al. |
| 6,377,215 B1 | 4/2002 | Halvorson et al. |
| 6,782,044 B1 | 8/2004 | Wright et al. |
| 6,789,004 B2 | 9/2004 | Brousseau et al. |
| 7,416,262 B2 | 8/2008 | Ring |
| 8,157,218 B2 | 4/2012 | Riley et al. |
| 8,311,689 B2 * | 11/2012 | Plawecki ......................... 701/2 |
| 8,428,798 B2 | 4/2013 | Kull |
| 2003/0178534 A1* | 9/2003 | Peltz ...................... B61L 17/00 264/187 A |
| 2005/0121971 A1 | 6/2005 | Ring |
| 2005/0143874 A1* | 6/2005 | Peltz ...................... B61L 3/125 701/19 |

\* cited by examiner

METHOD AND APPARATUS FOR POSITIONING A VEHICLE

CROSS-REFERENCE TO RELATED APPLICATIONS

This application is a continuation-in-part of, and claims priority to: U.S. application Ser. No. 13/617,897 filed on Sep. 14, 2012; U.S. application Ser. No. 13/618,093 filed on Sep. 14, 2012; and U.S. application Ser. No. 14/180,920 filed on Feb. 14, 2014 which in turn claims priority to U.S. Provisional Application No. 61/790,873 filed on Mar. 15, 2013, all of which are incorporated by reference herein in their entireties.

BACKGROUND

1. Technical Field

Embodiments of the invention relate generally to control systems for vehicles. Other embodiments relate to control systems for positioning vehicles using vehicle motors and/or braking systems.

2. Discussion of Art

Rail car switching, shunting, and classification are integral aspects of rail freight operations. These procedures are performed in switching yards or classification yards, which include multiple rail tracks branching from one or more lead tracks and joining together at one or more exits. To maximize operational efficiency, several cars or trains of cars are typically moving simultaneously along different branches within a yard. Due to the presence of multiple stationary rail cars or stub trains on intervening tracks, an operator in a locomotive moving on a first track may not be able to see moving cars on a track branching from the first track. Accordingly, locomotive operators may coordinate their actions via a yardmaster stationed in a control tower overlooking the yard.

Three-way communication between operators and a yardmaster can introduce lag time and error, which can be undesirable while moving multiple pieces of heavy rail equipment. As such, some yards include systems by which a yardmaster may remotely control and coordinate movement of multiple stub trains ("tower control systems"). Previous attempts to properly position trains relied upon manual intervention to control throttle and brakes while attempting to observe train position, using systems not integrated with a tower control system. For example, to position a train being operated by the tower control system under a speed control mode, the train would have to be unlinked from the tower control system and an onboard crew would have to move the train. Such nonintegrated or unlinked controls potentially reduce efficacy of the tower control system.

For trains carrying bulk cargo such as ore or coal (for example), the bulk cargo is unloaded at a rail yard. At some rail yards, unloading equipment is deployed at the rail yard for controllably interacting with the train for dumping the bulk cargo. For example, when trains enter mining unloading equipment, they may be moved into position via an external indexing arm. In certain cases, external forces (wind, grade, etc.) can cause the train to move slightly out of position once the indexing arm retracts. This can lead to impacts between the train and the unloading equipment, and the possibility of the train being in contact with the unloading equipment with a sufficient degree of force to prevent the unloading equipment from functioning properly. Similar challenges may be faced in the context of operating marine vessels (e.g., loading and unloading vessels at a dock), on-road vehicles (e.g., processing cargo trailers at a transportation hub), and off-road vehicles other than rail vehicles (e.g., unloading mining haul vehicles).

As will be appreciated, it may be desirable to provide a method and apparatus to reposition a train at a rail yard, or move/guide a vehicle relative to its environment more generally, which is different from existing systems.

BRIEF DESCRIPTION

In an embodiment, a method for remotely controlling a plurality of vehicles includes receiving at an external control system, under an indexing mode of operation, a first signal from off-board vehicle indexing equipment. The method further includes establishing in the external control system a positioning mode of operation in response to the first signal. Further, under the positioning mode of operation, and in response to actuation of an interface of the external control system, the method includes sending from the external control system a second signal to a first vehicle of the plurality of vehicles, the second signal comprising a first command to adjust a throttle setting of first vehicle and a second command to idle a throttle of at least one second vehicle of the plurality of vehicles.

In another embodiment, a system for controlling a vehicle includes an off-board control unit configured for communication with an on-board transceiver. The on-board transceiver is mounted in the vehicle and operatively connected with at least one power system of the vehicle. The off-board control unit further configured for receiving a first signal from off-board vehicle sensing equipment disposed proximate the first vehicle. The system also includes an operator control unit operatively connected with the off-board control unit and a selector manually movable to a plurality of pre-determined positions, such that in response at least to movement of the selector among the pre-determined positions, the off-board control unit is configured to establish corresponding modes of operation. The off-board control unit is configured to establish a positioning mode of operation, corresponding to one of the pre-determined positions of the selector, in response to the first signal received from the off-board vehicle sensing equipment. When operating in the positioning mode of operation, the off-board control unit is configured to transmit to the onboard transceiver second signals for positioning the vehicle independently from a plurality of vehicles of which the first vehicle is in proximity to.

In yet another embodiment, a system for remotely controlling a plurality of vehicles includes an off-board control system configured for communication with the plurality of vehicles and to receive a first signal from vehicle environment equipment. The off-board control system includes an interface. The off-board control system is configured to transition from an indexing mode of operation to a positioning mode of operation responsive to receiving the first signal. The off-board control system, when operative in the positioning mode of operation and in response to actuation of the interface, is configured to send from the off-board control system a second signal to a first vehicle of plurality of vehicles. The second signal includes a first command to adjust a throttle setting of the first vehicle and a second command to idle a throttle of any other vehicle of the plurality of vehicles.

In another embodiment, a system for controlling a vehicle includes an on-board transceiver mounted in said vehicle and operatively connected with at least one power system of the vehicle. The on-board transceiver configured to receive from an off-board control unit, not mounted in said vehicle, command signals for positioning the vehicle independently from a plurality of vehicles that the first vehicle is proximate to. The command signals include a signal for setting a throttle control of the vehicle, a signal for adjusting a braking parameter of the vehicle, and a signal for discontinuing a distributed power control mode of the vehicle.

DRAWINGS

The present invention will be better understood from reading the following description of non-limiting embodiments, with reference to the attached drawings, wherein below:

DETAILED DESCRIPTION

Figure 1:
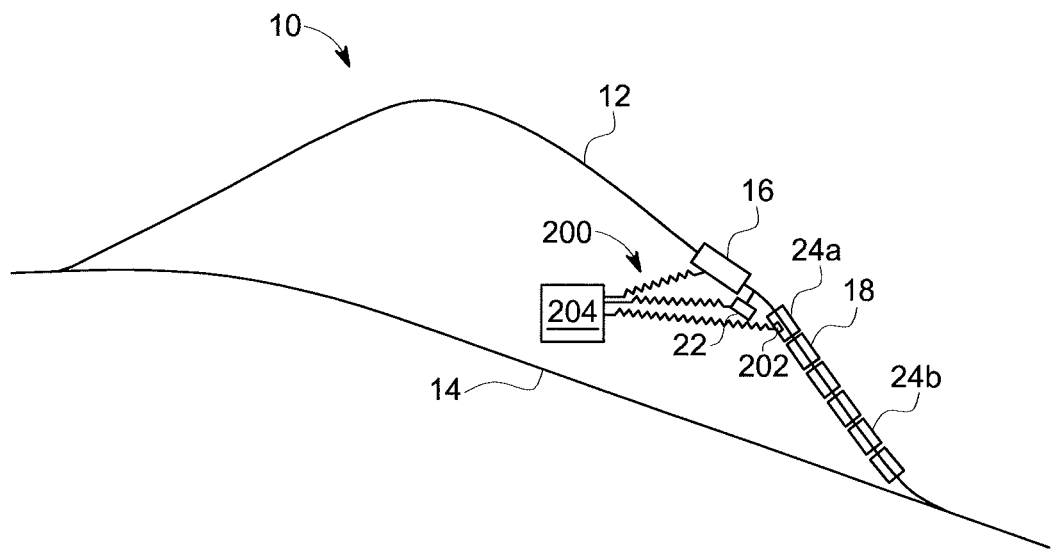
FIG. 1 illustrates in schematic view a bulk cargo unloading operation including an external control system according to an embodiment.

Reference will be made below in detail to exemplary embodiments of the invention, examples of which are illustrated in the accompanying drawings. Wherever possible, the same reference characters used throughout the drawings refer to the same or like parts. Although exemplary embodiments of the present invention are described with respect to mining operations, embodiments of the invention also are applicable for use with cargo unloading, generally.

Aspects of the invention relate to external control systems for positioning vehicles over relatively short distances. ("External" means the control system is not on-board any vehicles; the control system, however, may communicate with on-board systems of a vehicle, for controlling the vehicle.) For example, the external control system may be a tower control system for positioning a train or other rail vehicle consist over short distances. Certain aspects relate to tower control systems and other external control systems for positioning vehicles (e.g., a train or other rail vehicle consist) within bulk cargo handling equipment, such as a rotary dumper or loader chute, in order to prevent impact of the vehicles against the unloading equipment. As further discussed below, operation of such equipment can require closely coordinating linear movement of a vehicle or series of vehicles (e.g., rail vehicle consist) along a loading route, with simultaneous adjustment of bulk cargo flow from a dump chute into the vehicles. Alternatively, operation of a rotary dumper can require precise positioning of a vehicle (e.g., a single car within a rail vehicle consist), so as to avoid damage to the vehicle and to the dumper when the vehicle (or portion thereof) is rotated about its lengthwise axis. Such short-distance positioning is sometimes referred to as "indexing," in which the vehicle is moved by less than or at most its length (e.g., a rail vehicle consist or a car within the rail vehicle consist is moved by less than or at most a single car length).

As used herein, a consist is a group of vehicles that are mechanically or logically linked to travel together along a route. For example, a rail vehicle consist is a group of rail vehicles that are mechanically linked to travel together along a track. A powered vehicle is a vehicle that is capable of self-propulsion. A non-powered vehicle is a vehicle that is incapable of self-propulsion. Locomotives are examples of powered rail vehicles, and certain passenger cars, box cars, flatbed cars, and ore/mining cars are examples of non-powered rail vehicles. A semi tractor (i.e., tractor unit, prime mover, or road tractor) is an example of a powered on-road vehicle, while a trailer (e.g., of the type configured to be attached to a semi tractor for hauling cargo along a public road) is an example of a non-powered on-road vehicle. A train comprising at least one locomotive, and possibly one or more ore/mining cars or other cargo cars, is an example of a rail vehicle consist. Plural interconnected self-propelled mining ore carts is another example of a rail vehicle consist. Wagon refers to a rail vehicle for carrying cargo. A tractor-trailer (semi tractor coupled to one, two, or more trailers) is an example of an on-road vehicle consist.

Moreover, as used herein, a "vehicle" is a machine used for transporting people or goods both on land, such as a car, truck, cart, OHV, mining vehicle, etc., and in other media, e.g., water. These include, but are not limited to vehicles powered by combustion engines, electric motors, or hybrid configurations, i.e., "motive power sources" or "motive power systems" as referred to herein. Embodiments of the invention may be particularly suitable for vehicles that may be remotely controlled, or that otherwise include automated or self-guiding functionality.

In embodiments, and with reference to FIG. 1, a bulk cargo unloading operation 10 may include a section of route 12 (e.g., a side road, or loop of track or other section of track) connected from a main route 14 (e.g., highway, or main rail line) through loading/unloading equipment 16. In the loading/unloading equipment 16, coal, iron ore, or other bulk products are dumped into or out of a cargo-carrying vehicle 18 (e.g., wagon) of a vehicle consist 20 that is positioned on the route 12. For example, the loading/unloading equipment 16 may include a dumper chute (which directs a continuous flow of bulk material into a vehicle positioned below the chute) or a rotary dumper cage (which inverts a vehicle positioned in the dumper cage).

When the vehicle consist 20 is adjacent the equipment 16, it may be in an "indexing" mode of operation, in which independent and automatic brakes are released while powered vehicle throttles are idled. Thus, indexing equipment 22 may be used to ensure that each vehicle 18 is properly positioned in its turn for operation of the equipment 16. However, the indexing equipment 22 may have a limited range of motion, sometimes less than a full vehicle length. Therefore, one or more powered vehicles 24 of the vehicle consist 20 are repeatedly throttled and braked—typically in a speed control mode—to move each vehicle 18 in turn into position for engagement by the indexing equipment 22. Then, the indexing equipment 22 performs a final adjustment of the vehicle 18 under the indexing mode. Once the vehicle 18 is positioned, independent and/or automatic brakes are set to hold position of the vehicle consist 20 and of the cargo-carrying vehicle 18. "Independent brakes" means the brakes of each locomotive or other powered vehicle 24 within the rail vehicle consist or other vehicle consist 20, which can be controlled independently of the "automatic brakes" that may be installed on the cargo-carrying vehicles 18. (In a train, the automatic brakes installed on the train wagons 18 are operable all together and are also referred to as "train brakes.")

In non-rail embodiments, the independent brakes or simply "brakes" are a stopping mechanism of a vehicle that may be controlled by an external controller.

As mentioned, in certain embodiments, the system may be used with non-rail vehicles. For example, embodiments may be used to move vehicles such as trucks, automobiles, etc., relative to "indexing" or "vehicle environment equipment" such as a vehicle transporter, unloading equipment, vehicle storage equipment such as parking structures, and the like. Moreover, such equipment may be barriers that define a roadway, passage or other space. In certain of these embodiments, the "indexing mode" is a mode in which a control system external to a vehicle or plurality of vehicles receives a signal from indexing or other vehicle environment equipment regarding a position, spatial relationship, or other relationship between the vehicle/vehicles and the equipment. In this regard, the "indexing mode" facilitates deliberate movement of a vehicle relative to its environment.

Referring back to a rail embodiment, desirably, each wagon 18 is positioned by the indexing equipment 22 only within the "slack action" of the adjoining couplers. "Slack action" is a typical result of rail vehicle consist dynamics when brakes are applied from front to back: each wagon 18 approaches the preceding wagon or locomotive or other powered rail vehicle 24, such that tension is taken off the connecting couplers. Thus, slack action is inherent to a positioning operation where only a lead (e.g., forward) powered rail vehicle 24*a* is used for positioning the entire rail vehicle consist 20. Advantageously, slack action relieves the indexing equipment 22 from exerting the force that might otherwise be required to move multiple loaded wagons 18. However, due to the slack action, motion within the rail vehicle consist 20 can occur after the indexing equipment 22 is retracted. In particular, movement of a wagon 18 by the indexing equipment 22 away from an equilibrium of its slack action can establish a restoring force within the adjacent couplers, such that after the indexing equipment retracts, the wagon returns to equilibrium. Thus, slack action can create a situation where a wagon 18 has been positioned by the indexing equipment 22, but then is pulled out of position. Also, in certain cases, external forces (wind, grade, etc.) can cause a wagon 18 to move slightly out of position once the indexer 22 retracts.

Motion of a vehicle 18, after indexing, can lead to impacts between the vehicle 18 and the equipment 16. After-indexing motion also can lead to a condition where the vehicle 18 rests against the loading/unloading equipment 16 with sufficient force to interfere with operation of the equipment. Such impacts or interferences can damage the vehicle and/or the unloading equipment, causing repair expense and downtime.

Accordingly, movement relative to the indexing/vehicle environment equipment, e.g., the unloading operation 10, can be controlled by an embodiment of the external control system, such as a tower control system 200, which is configured for a positioning mode. In an embodiment, the external control system 200 is commissioned upon delivery, based on topography of the environment that the rail loop 12 (or other section of track or route) and based on data describing a template consist. Consist data may include, for example, the numbers, locations, and loaded and empty weights of cargo-carrying vehicles 18 and powered vehicles 24 (e.g., locomotives) within the vehicle consist 20. All of the vehicle consists used for a given bulk cargo unloading operation may be set up to match a "template" consist that is determined by the number of powered and non-powered vehicles that can fit on the section of route 12 (e.g., track loop) without spilling over onto the main route 14 (e.g., main rail line). In some aspects of the invention, topography of the section of route 12 may also play a role in determining the template consist for a particular mine unloading operation or other unloading operation.

In some aspects of the invention, during commissioning of the external (e.g., tower) control system 200, parameters of the external control system are set to provide for desired response of the vehicle consist 20 to any command for movement, at any location within the unloading operation 10 that is controlled by the external control system. For example, speed control mode parameters can be configured corresponding to various lead powered vehicle 24*a* locations, such that when the external control system 200 receives a requested speed for the vehicle consist 20, appropriate throttle and/or brake control signals can be sent from the control system to a first vehicle from among a plurality of vehicles, or the lead and remote powered vehicles 24*a*, 24*b* of the vehicle consist for achieving the requested speed. Moreover, positioning mode parameters can be configured corresponding to various vehicle locations, e.g., lead powered vehicle 24*a* locations, such that when the external (e.g., tower) control system 200 receives a request to stop or park the vehicle consist 20, or first vehicle/plurality of vehicles, appropriate brake control signals can be sent to a vehicle within a plurality of vehicles for holding their position relative to one another to roadside sensors, external equipment and the like, or to the lead powered vehicle and to remote powered vehicles 24*b* for holding the position of the vehicle consist 20.

In some aspects, by allowing a tower operator, or other vehicle control/operator, to order small movements of vehicles and/or the vehicle consist by discrete control of a throttle joystick, button, or other interface of the external control system 200, and by maintaining a throttle command until brakes have reached a sufficient level to prevent movement when the throttle is idled, vehicles and/or the vehicle consist 20 can be moved and held in a position where impacts or other interference with the equipment, obstacles, or unloading equipment 16 are prevented. In selected aspects, a positioning mode is integrated into the external control system 200, whereby all control safety interlocks are present and enforced during consist positioning movements.

Figure 2:
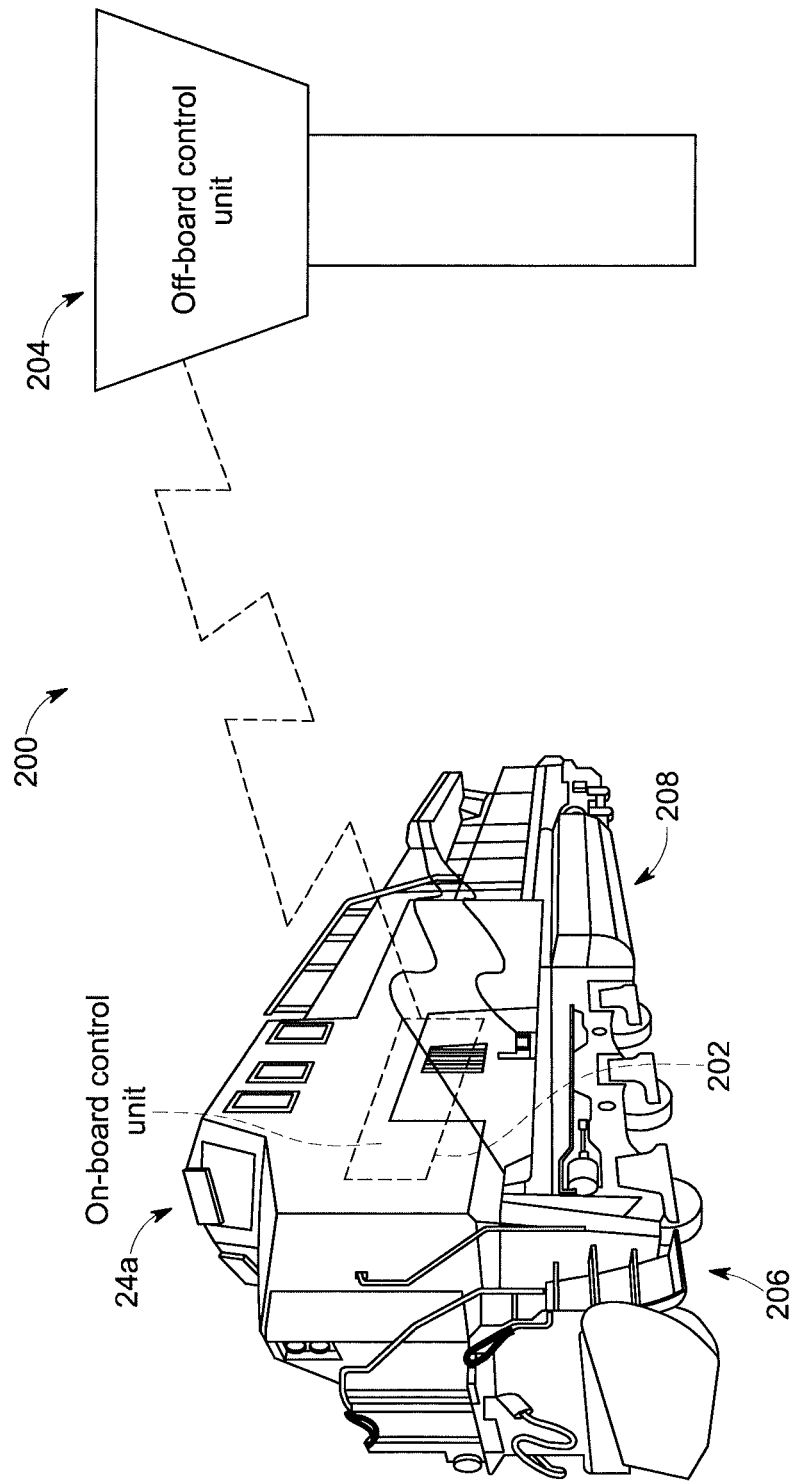
FIG. 2 illustrates in perspective schematic view an external control system according to an embodiment.
Figure 3:
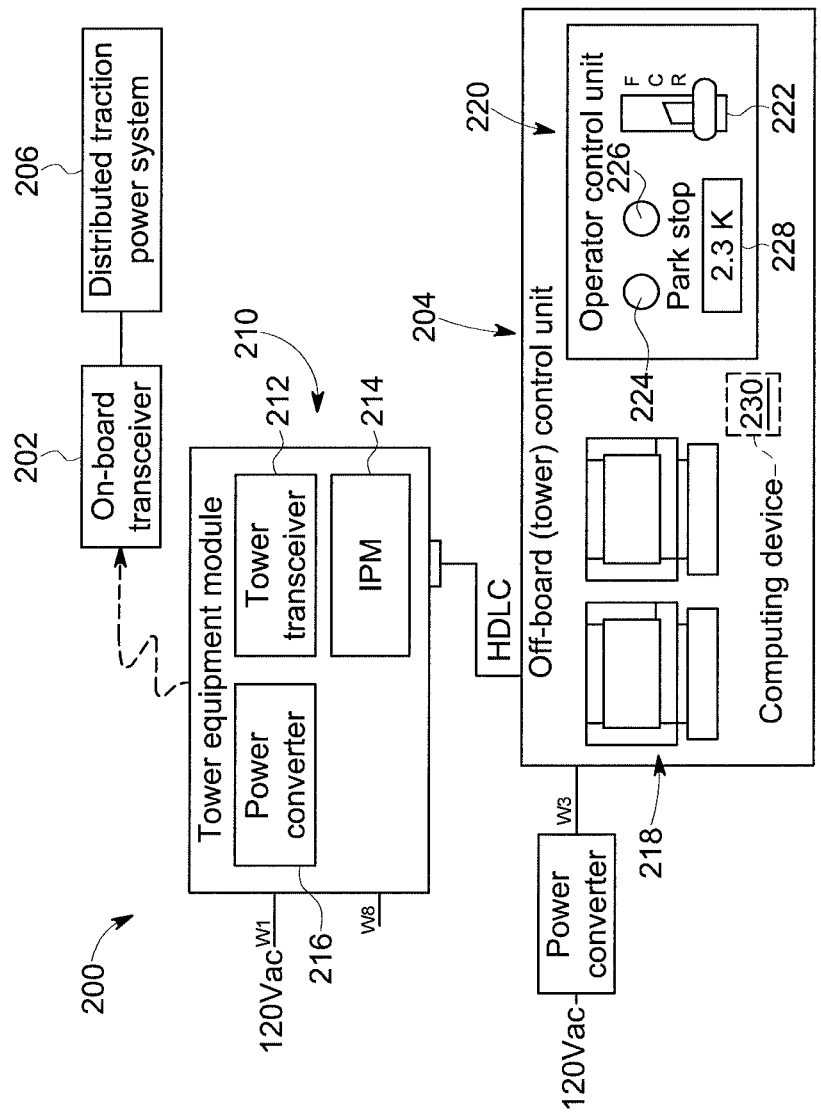
FIG. 3 illustrates in schematic view the external control system shown in FIG. 2.
Figure 4:
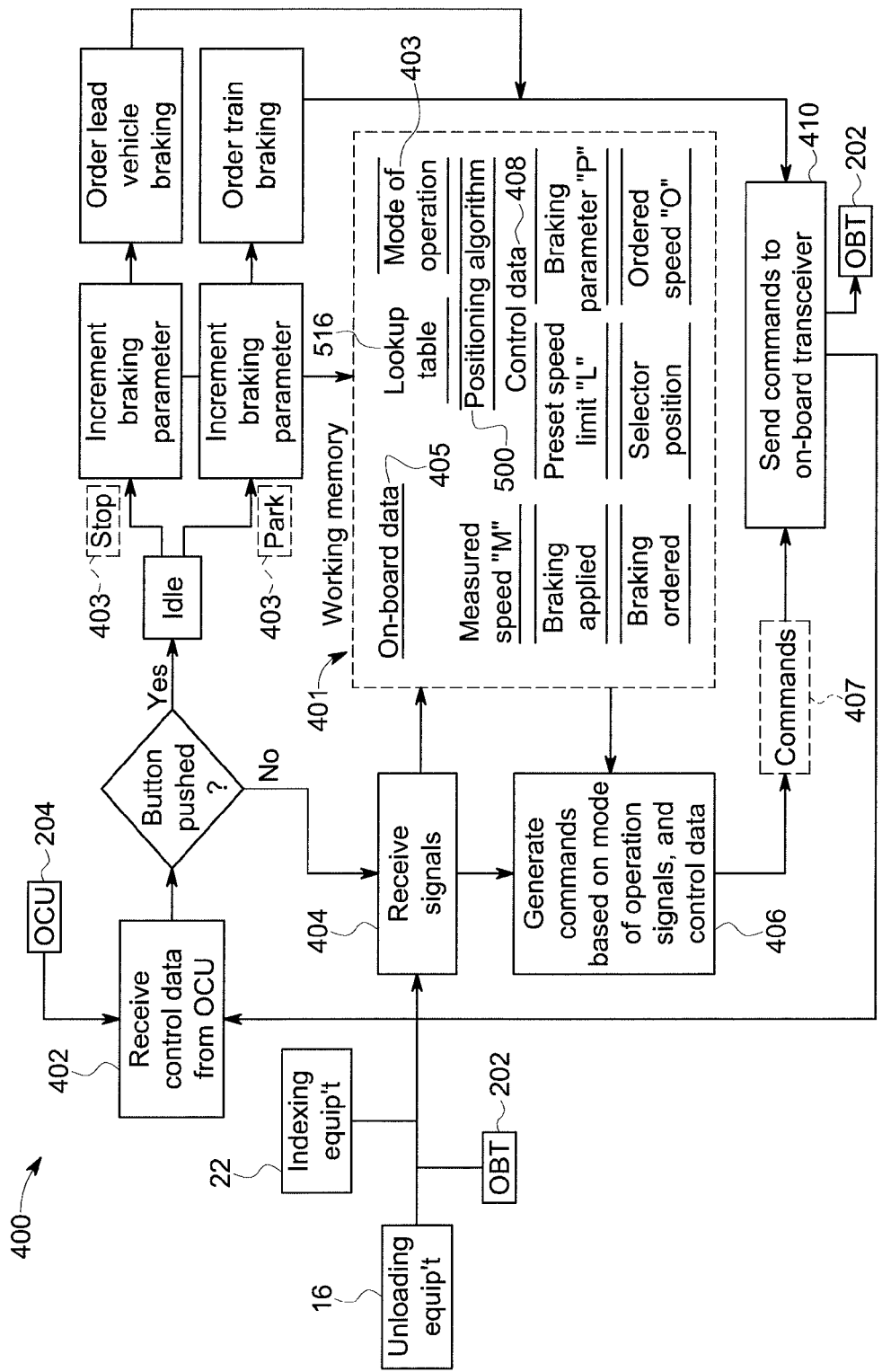
FIG. 4 illustrates in flow diagram view a process accomplished by the external control system shown in FIGS. 2-3.

In embodiments, as shown in FIGS. 2-4, an external control system 200 is commissioned for use in the rail yard or other unloading operation 10. The external control system 200 is configured to provide a positioning mode of operation 500 (FIG. 5) in response to certain conditions.

In embodiments that are configured for use with other vehicles, e.g., automobiles, trucks, etc., the control system may not be located on or in a tower but is otherwise external to the vehicles to be controlled, e.g., as noted above, not located within or on any of the vehicles. These are referred to herein as "external control systems." This term encompasses tower based control systems.

Referring to FIGS. 2-4, the tower control system 200 (or other external control system) includes an off-board control unit 204 which is configured for communication with a transceiver 202 onboard the lead locomotive or other powered rail vehicle 24*a*, or, in a non-rail context, a first vehicle within a plurality of other vehicles. The on-board transceiver 202 is in communication with a traction power system 206 of the lead powered rail vehicle 24*a*, or motive power system of a first vehicle, and with sensors 208 that may be installed on the wagons 18, the lead powered rail vehicle, or the first vehicle/vehicles in a plurality of vehicles. Although wireless radio communication will be shown and described hereinafter, the invention is not so limited, and may include laser, acoustic, or through-rail electrical modes of communication, etc. In particular embodiments, the traction power system 206 is a distributed power system, in which the on-board transceiver 202 is in communication with, and controls, a plurality of fundamentally separate traction power sources that are temporarily joined together—e.g., two or more powered rail vehicles 24a, 24b that are hitched together in the rail vehicle consist 20. However, the invention is not limited solely to distributed traction power systems, but is equally applicable to trains or other vehicle consists with only a single source of traction power (single powered rail vehicle).

In non-rail embodiments, distributed power systems include systems in which a vehicle, or plurality of vehicles, is independently powered and controllable, individually and/or collectively, via an on-board transceiver and/or an external control system. In such embodiments, the on-board transceiver 202 is in communication with a motive power source/system of a vehicle, either directly or through an engine control unit (ECU), or like equipment, of a vehicle.

FIG. 3 shows further details of the control system 200, which may include an external/tower equipment module 210 that houses a transceiver 212 for intermediating communication between the off-board control unit 204 and the on-board transceiver 202. The equipment module also may house an integrated processor module (IPM) 214 and a power converter 216. In some embodiments, the power converter receives 120 Vac and supplies 13.6 and 72 Vdc.

As shown in FIG. 3, according to one embodiment, the off-board control unit 204 includes multiple displays 218 on which a desired speed setting and measured vehicle speed are shown, as well as an operator control unit (OCU) 220. Each display is a remote session-based device connected to the IPM 214, which handles all control signals and consist data for the operator displays 218. The OCU 220 includes at least the following controls: a multi-position selector 222, a first button or other actuator 224 to initiate a parking-related operation (i.e., PARK button), and a second button or other actuator 226 for initiating a stopping-related operation (i.e., STOP button). In some embodiments, the OCU also may include an auxiliary display 228 as shown.

In some embodiments, the selector 222 may include a dial, a switch, a position encoder, or any equivalent device suitable for selecting among more than two options. In some embodiments, the buttons 224, 226 may be spring-return push buttons. Toggle switches, sliders, or the like are equally suitable. In certain embodiments, the functions of the two actuators 224, 226 may be combined into a single actuator, for example, a three-way selector switch. The functions of the two buttons 224, 226 may be combined into the selector 222, or the buttons may be mounted on the selector. The selector 222 as well as the actuators 224, 226 and the optional display 228 are shown and described herein as being physically separate components within an assembled unit, however, the displays 218 and the OCU 220 equally can be implemented partly or entirely via a single advanced interface such as a touchscreen.

The displays 218, 228 and the OCU 220 are coordinated by a computing device 230. "Computing device" as used herein refers to a general purpose integrated circuit (e.g., controller- or processor-based unit), a custom ASIC, an FPGA, a custom analog circuit, or other like device. As shown in FIG. 3, the computing device 230 is connected with the integrated processor module 214 via a point-to-point high-level data link control ("HDLC") layer. In certain embodiments, the functionality of the computing device 230 may be implemented in the IPM 214 itself.

As illustrated in FIG. 4, the computing device 230 is configured to implement a continuous-loop control process 400 for generating and sending commands 407 to the onboard transceiver 202 via the IPM 214 and the tower transceiver 212. In implementation of the process 400, the computing device 230 makes use of a working memory 401. The working memory 401 may be composed of any electronically or optically read-writeable media, such as EEPROM, NAND flash, SDRAM, a hard drive, an optical disc, vacuum tubes, a capacitor bank, or other such devices.

Each iteration of the process 400 includes a step 402 of checking and setting a mode of operation 403 of the off-board control unit 204. For example, pressing one of the first actuator 224 (e.g., STOP button) or second actuator 226 (e.g., PARK button) establishes a corresponding mode of operation 403 of the off-board control unit 204 that causes the computing device 230 to generate and send to the on-board transceiver 202, via an external control system transceiver, e.g., tower transceiver 212, commands that idle the traction power system and that order braking of a powered rail vehicle 24 or other vehicle, or of the entire rail vehicle consist or other vehicle consist 20, respectively.

After the mode of operation is checked, the process 400 proceeds to a step 404 of receiving signals from the on-board transceiver 202 and/or from other sources within, for example, the rail yard or other unloading operation 10, including the unloading equipment 16, indexing equipment 22, or other vehicle environment equipment. ("Rail yard" is meant to include any arrangement of tracks off of a main line, including humpyards, sorting yards, or unloading loops/depots, and as discussed above, unloading operation more generally refers to any area where vehicles are to be remotely controlled, e.g., for loading and unloading cargo.)

In non-rail contexts, the other signal sources might include vehicle parking/storage/movement sensors within, for example, a parking lot or warehouse loading zone, and the like. They may also include roadway sensors in, for example, an automated or self-guided vehicle context.

The computing device 230 stores received signals in the working memory 401 as on-board data 405. The on-board data 405 may include a measured speed "M" as well as indications that braking has been applied or that a braking order has been received in the vehicle where the on-board transceiver is installed. The measured speed "M" may be obtained by the on-board transceiver 202 from a control system on some powered vehicles, from a trainline interface module (TIM) on some other powered vehicles, or from an ECU in a vehicle.

Next, at a step 406 the computing device 230 generates commands 407 to be sent to the on-board transceiver. The commands 407 are generated according to an algorithm, which corresponds to the mode of operation 403. The algorithm generates the commands 407 with reference to the on-board data 405 and further with reference to control data and internal signals 408 that are stored in the working memory 401. Exemplary modes of operation 403, and on-board data 405, have been discussed above. The control data and internal signals 408 may include the braking parameter "P", a preset speed limit "L", a selector position "H", and an ordered speed "O". At a step 410, the external control system 200 then sends the commands 407 to the on-board transceiver 202 before looping back to again check for control data input from the off-board control unit 204.

Figure 5:
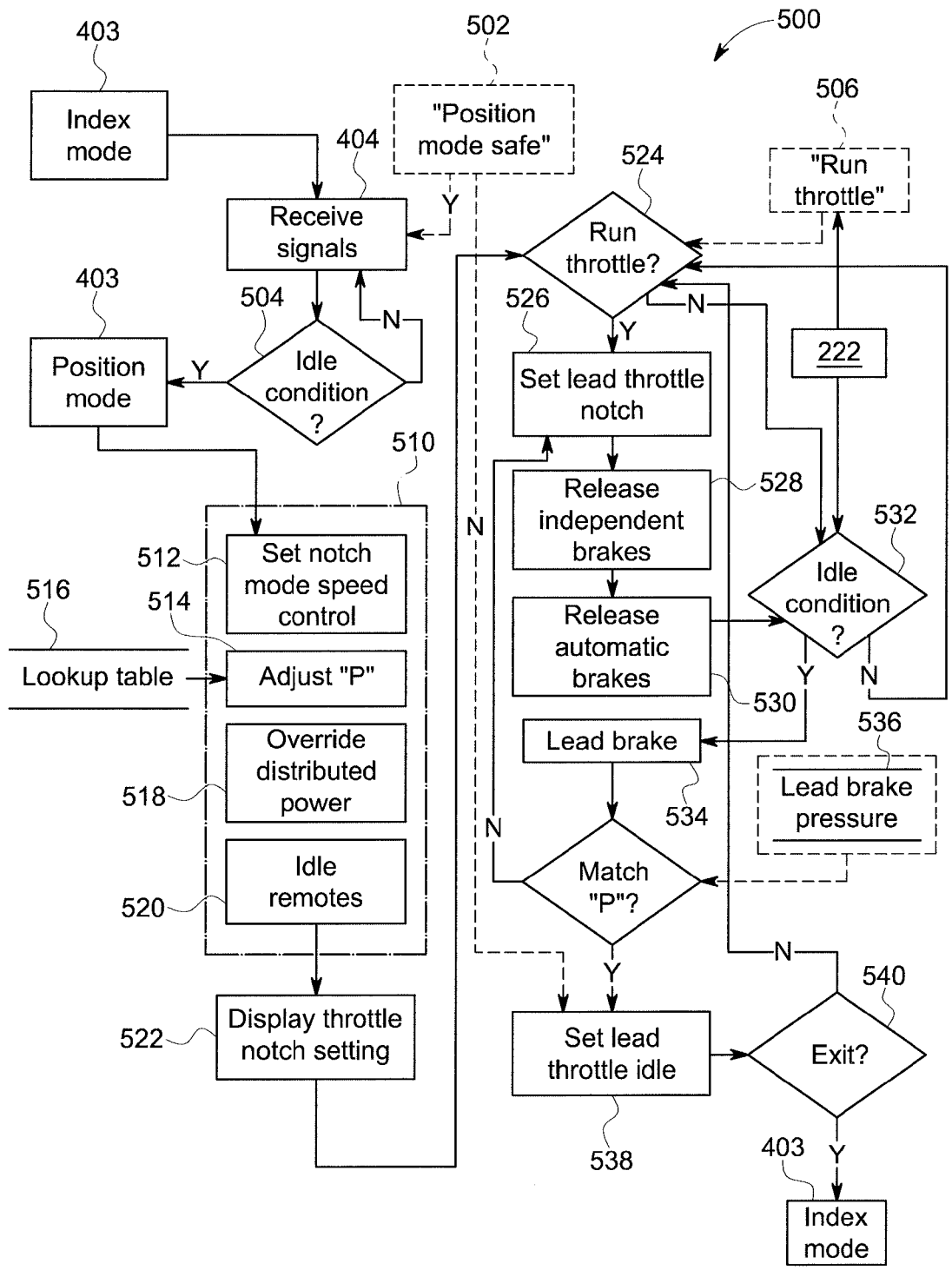
FIG. 5 illustrates in flow diagram view an algorithm carried out by the external control system shown in FIGS. 2-3, according to one aspect.

Referring to FIG. 5, according to one aspect, the external control system 200 can be configured to establish a "positioning" mode of operation 403 and to generate the commands 407 according to a corresponding positioning algorithm 500, as follows.

First, at step 404 (FIGS. 4 and 5), the off-board control unit 204 receives a first signal 502 from the indexing equipment or other equipment 22 that is disposed within the unloading operation 10. (The first signal may be a POSITION MODE SAFE signal indicative that the equipment is currently in a state where the positioning mode of operation can be safely carried out.) In case the external control system 200 is presently in an "indexing" mode of operation 403 (generally as discussed above), then this signal 502 causes the external control system to verify at a step 504 whether it is in an idle condition (e.g., with reference to FIG. 3, the multi-position selector 222 is set to a "CENTER", "C", or "IDLE" selection; or one of the PARK or STOP buttons 224, 226 has been pressed).

Referring again to FIG. 5, upon verifying the idle condition, then the external control system 200 begins to execute its positioning algorithm 500. Under this algorithm 500, the external control system 200 is configured to permit movement of a vehicle, e.g., lead powered rail vehicle 24a, for relieving pressure on consist couplers or for positioning the vehicle relative to the dumper cage or other unloading equipment 16, or, in a non-rail context, positioning or moving vehicles relative to one another or relative to off-board equipment, or guiding vehicles along, for example, a roadway or the like. Accordingly, the computing device 230 performs the following step 510 to generate a second signal comprising one or more commands 407.

At step 510, the computing device 230 inserts a command signal 512 for changing the lead powered rail vehicle 24a (or other vehicle) movement mode from speed control mode to throttle mode (e.g., in a throttle notch mode, default throttle notch 1). Throttle notches are discrete levels of powered rail vehicle engine throttle, which roughly correlate to the tractive effort produced by the powered rail vehicle's traction motors. In one embodiment of the invention, there are eight throttle notch settings, plus an idle setting. One reason for going into discrete throttle notch control for purposes of the positioning algorithm 500 is to limit the amount of tractive effort generated on the lead powered rail vehicle 24a. Another method for limiting powered rail vehicle tractive effort involves modification of the speed control software of the powered rail vehicle, which varies from powered rail vehicle type to powered rail vehicle type. Another reason for going into discrete throttle notch control is that this is a "pseudo open loop" control mode, where operator judgment controls adjustment of the throttle setting within performance limits enforced by the tower control system 200. For example, instead of automatically adjusting the throttle setting to approach an ordered speed at a design rate of acceleration (speed control mode), in throttle notch control mode the tower control system will maintain an ordered throttle unless a speed limit is met or exceeded, in which case the tower control system will "cut" or idle the throttle and possibly apply brakes to keep speed within limits.

In non-rail embodiments, a command signal may be sent to a vehicle to place the vehicle in a forward or reverse gear/mode and to adjust a throttle position, i.e., a "throttle setting," via a vehicle ECU. In certain embodiments, command signals, e.g., steering parameter "S," may be used to adjust a steering setting/angle so that the vehicle may change its position to guide, for example, a vehicle in a storage facility or along a roadway. As will be appreciated, such signals are useful for vehicles that include self-guided/automated functionality.

At step 510 the computing device 230 also inserts a command signal 514 for adjusting the braking pressure parameter "P" to a value that is sufficient to prevent unwanted vehicle movement, e.g., a rail vehicle consist 20 from rolling backwards in case all throttles are set to idle. A "sufficient value" of the brake pressure "P" can vary under operating conditions, is typically determined as part of the test and commissioning of the external control system 200, and is sent by the external control system to a first vehicle (or lead powered rail vehicle) as part of the second signal. For example, the pressure "P" may be selected from a lookup table 516 (also stored in the working memory 401, shown in FIG. 4), which indexes various values of braking pressure with reference to a vehicle within a vehicle environment, e.g., a lead powered rail vehicle 24a position within the rail yard, and optionally also with reference to consist data including car weights. Alternatively, the pressure "P" may be determined based on the highest pressure ordered to stop (e.g., actuating the STOP button) the rail vehicle consist 20 at its most recent stopped position.

At step 510, the computing device 230 inserts a command signal 518 to override or interrupt a distributed power control mode affecting certain vehicles among a plurality of vehicles, such as remote powered rail vehicles 24b (if any) of the rail vehicle consist 20. The computing device 230 also inserts another command signal 520 to set remote powered rail vehicle throttle(s) at idle, and waits for receipt of a RUN THROTTLE signal (i.e., signal indicating a commanded change of throttle) from an operator interface, such as the multi-position selector 222.

At step 522, the external control system operator display 218 changes from displaying set speed to displaying throttle notch setting or throttle position. Prior to commencement of movement, throttle IDLE is displayed.

At step 524, the computing device 230 checks for the RUN THROTTLE signal 506 (which can be initiated, e.g., by operator actuation of the multi-position selector 222; alternatively, via soft key on display 218, pre-programmed time function, configurable parameter, etc.). On receipt of the RUN THROTTLE signal 506, the computing device 230 inserts a command signal 526 to adjust the setting of the lead powered rail vehicle 24a throttle. For example, for each time increment that the multi-position selector 222 is held away from its IDLE position, then the computing device 230 will increment the command signal 526 by one throttle notch or other throttle position increment (up to but not exceeding a pre-defined throttle notch/position limit, for example, not to exceed notch setting N2). The computing device further inserts a command signal 528 to set independent (e.g., locomotive) brake(s) at release, and another command signal 530 to set automatic brakes at release, regardless of vehicle, e.g., lead powered rail vehicle 24a, throttle and brake status.

At step 532, in response to the multi-position selector 222 being released to IDLE position (or in response to pressing a PARK or STOP button 224 or 226, or in response to touching a soft button of the display 218), the computing device 230 inserts a braking command signal 534, then continuously monitors the on-board data 405 to check a vehicle, e.g., a lead powered rail vehicle brake pressure 536. Until the lead powered rail vehicle brake pressure 536 reaches the braking pressure parameter "P", the computing device 230 continues to insert the same throttle setting command signal 526 as was being sent before the multi-position selector was idled. Thus, tractive effort is maintained to prevent unwanted movement of a vehicle or back slippage of the lead powered rail vehicle 24a until adequate braking is provided to hold the vehicle consist.

On matching lead powered rail vehicle brake pressure 536 to the braking pressure parameter "P", at step 538 the computing device 230 inserts a command signal to idle the lead powered rail vehicle throttle. At step 540, the computing device 230 checks for a signal whether to exit from positioning mode, and, in case such signal is received, restores the "indexing" mode of operation 403.

Figure 6:
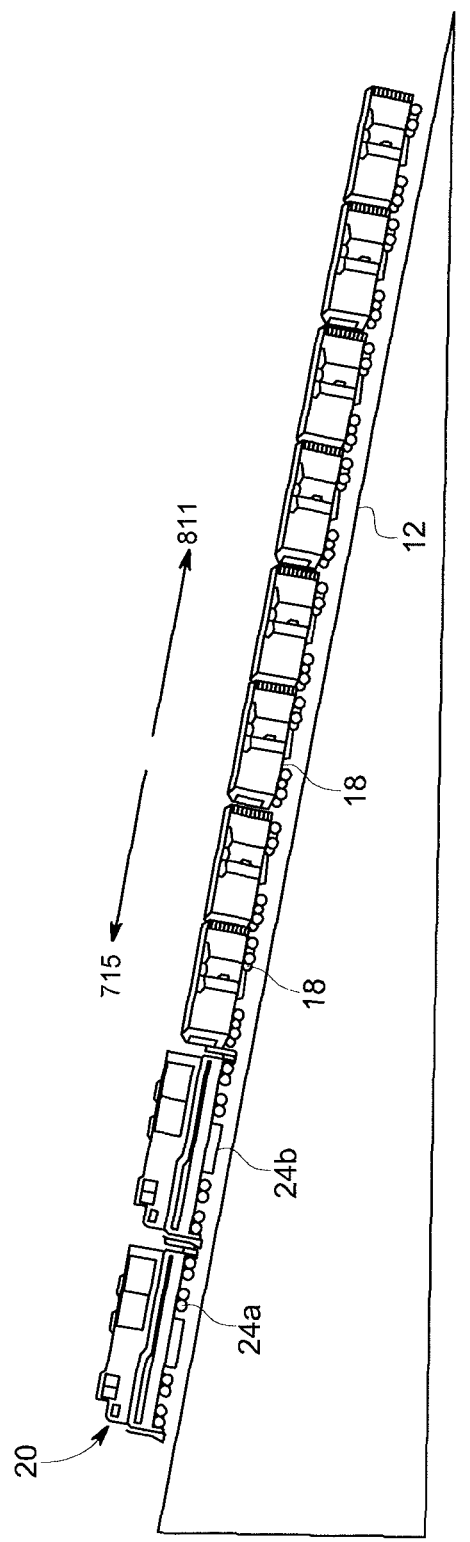
FIG. 6 shows in schematic view a rollback phenomenon.

Referring now to FIG. 6, in order to move the whole vehicle consist 20 forward, or plurality of vehicles, so as to bring a next cargo-carrying vehicle 18 into position, the brakes must be released while tractive power is applied when all or part of the vehicle consist 20. If the vehicle consist is located on a grade or incline, then rollback (as shown schematically in FIG. 6) can be caused by the weight of the vehicle consist 20 exceeding the instantaneous torque provided by electric traction motors. Once rollback starts to happen, increasing backward movement 811 of the vehicle consist 20 requires increasingly larger forward torque (ordered movement 715) in order to stop the vehicle consist. Frequently, brakes must be reapplied and another attempt must be made at forward motion. In non-rail vehicle contexts, unwanted movement of a plurality of vehicles relative to the vehicles or to off-board equipment may also be possible.

Rollback of the rail vehicle consist 20, or unwanted movement within a plurality of other vehicles, can lead to impacts between the vehicles, e.g., rail vehicle consist 20, and the loading/unloading equipment 16 or other equipment, e.g., vehicle transporter, etc. Unwanted movement/rollback also can lead to a condition where the vehicle or vehicle consist 20 rests against the loading/unloading equipment 16 with sufficient force to interfere with operation of the equipment. Such impacts or interferences can damage vehicles and/or the equipment, causing repair expense and downtime.

Referring back to FIG. 2, aspects of the invention relate to a system for controlling a vehicle such as a rail vehicle 24a, by which unwanted movement, e.g., rollback, of the vehicle is prevented. In particular aspects, the system includes an on-board transceiver 202 of the rail vehicle 24a, or other vehicle. The on-board transceiver 202 sends and receives signals in communication with an off-board control unit 204. The on-board transceiver 202 also includes hardware and software for controlling operation of the rail vehicle 24a or other vehicle. In particular, the on-board transceiver 202 is operatively connected for controlling traction/movement and braking of the vehicle, e.g., rail vehicle 24a. The on-board transceiver 202 can be configured in various modes of operation. For example, in a rollback prevention mode, the on-board transceiver 202 adjusts traction motors 206 of the rail vehicle 24a or other vehicle to achieve a pre-determined minimum tractive effort prior to releasing a braking system 208 of the vehicle. Rollback/unwanted movement may also be prevented in other vehicle types by engaging a braking system, engaging/disengaging a clutch, and/or selecting a forward gear from a gearbox/transmission.

Referring now to FIG. 3, the details of an external control system 200, e.g., tower control system, according to embodiments of the invention are depicted. The external control system may include an equipment module 210 that houses a transceiver 212 for intermediating communication between the off-board control unit 204 and the on-board transceiver 202. The equipment module also may house an integrated processor module (IPM) 214 and a power converter 216. In some embodiments, the power converter receives 120 Vac and supplies 13.6 and 72 Vdc.

Moreover, in one embodiment, the off-board control unit 204 includes multiple displays 218 on which a desired speed setting and measured vehicle speed are shown, as well as an operator control unit (OCU) 220. Each display is a remote session based device connected to the IPM 214, which handles all control signals and consist data for the operator displays 218. The OCU 220 includes at least the following controls: a multi-position selector 222 as well as a first actuator 224 (e.g., PARK button) and a second actuator 226 (e.g., STOP button). In some embodiments, the OCU also may include an auxiliary display 228 as shown. In some embodiments, the selector 222 may include a dial, a switch, a position encoder, or any equivalent device suitable for selecting among more than two options. In some embodiments, the actuators 224, 226 may be spring-return push buttons. Toggle switches, sliders, or the like are equally suitable. In certain embodiments, the functions of the two actuators 224, 226 may be combined into a single actuator, for example, a three-way selector switch. In select embodiments the functions of the two actuators 224, 226 may be combined into the selector 222, or the actuators may be mounted on the selector. The selector 222 as well as the actuators 224, 226 and the optional display 228 are shown and described herein as being physically separate components within an assembled unit, however, the displays 218 and the OCU 220 equally can be implemented partly or entirely via a single advanced interface such as a touch-screen. The displays 218, 228 and the OCU 220 are coordinated by a computing device 230, e.g., as described above.

As illustrated in FIG. 4, the computing device 230 is configured to implement a continuous-loop control process 400 for generating and sending commands 407 to the on-board transceiver 202 via the IPM 214 and the transceiver 212. In implementation of the process 400, the computing device 230 makes use of a working memory 401, e.g., as described above.

Each iteration of the process 400 includes a step 402 of checking and setting a mode of operation 403 of the off-board control unit 204. For example, pressing one of the first actuator 224 (e.g., STOP button) or the second actuator 226 (e.g., PARK button) establishes a corresponding mode of operation 403 of the off-board control unit 204 that causes the computing device 230 to generate and send to the on-board transceiver 202, via the transceiver 212, commands that idle the traction power system and that order braking of a locomotive 24 (or other powered vehicle) or of the entire vehicle consist 20, respectively.

After checking the mode of operation, the process 400 proceeds to a step 404 of receiving signals from the on-board transceiver 202 and/or from other sources within, in a rail vehicle context, the rail yard 10 including the unloading equipment 16 or the indexing equipment 22.

In non-rail embodiments, as mentioned above, the other signal sources might include vehicle parking/storage/movement sensors within, for example, a parking lot or warehouse loading zone, and the like. They may also include roadway sensors in, for example, an automated or self-guided vehicle context.

The computing device 230 stores received signals in the working memory 401 as on-board data 405. The on-board data 405 may include a measured speed "M" as well as indications that braking has been applied or that a braking order has been received in the vehicle where the on-board transceiver is installed. The measured speed "M" may be obtained by the on-board transceiver 202 from a control system on some vehicles (e.g., a locomotive control system on some locomotives), from a trainline interface module (TIM) on some other locomotives or other rail vehicles, or from an engine control unit (ECU) of a vehicle.

Next, at a step 406 the computing device 230 generates commands 407 to be sent to the on-board transceiver. The commands 407 are generated according to an algorithm, which corresponds to the mode of operation 403. The algorithm generates the commands 407 with reference to the on-board data 405 and further with reference to control data and internal signals 408 that are stored in the working memory 401. Exemplary modes of operation 403, and on-board data 405, have been discussed above. The control data and internal signals 408 may include the braking parameter "P", a preset speed limit "L", a selector position "H", and an ordered speed "O." At a step 410 the tower control system 200 then sends the commands 407 to the on-board transceiver 202 before looping back to again check for control data input from the off-board control unit 204.

Figure 7A:
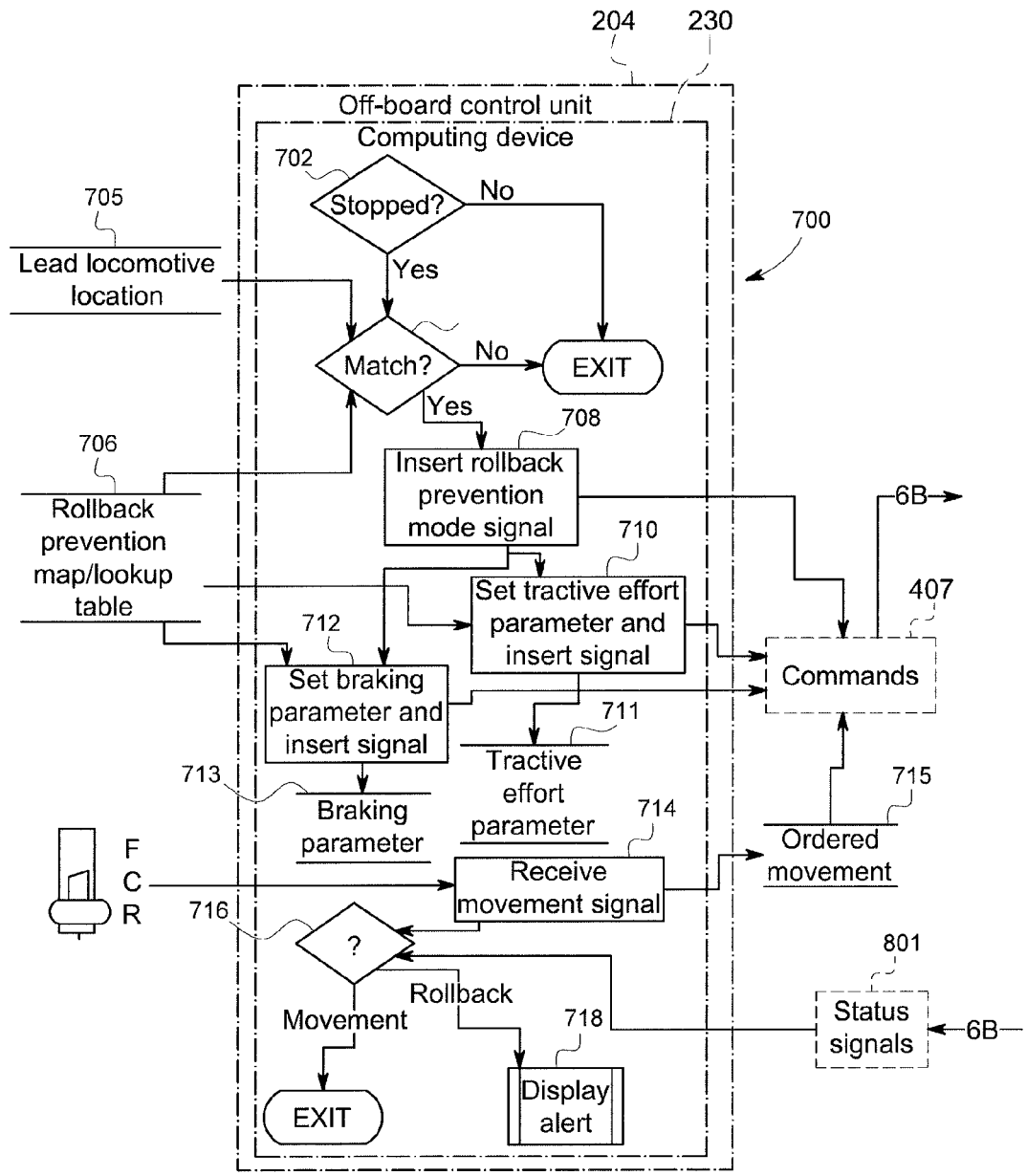
FIGS. 7A-7C show in schematic view a rollback prevention mode of the external control system, according to aspects of the invention.
Figure 7B:
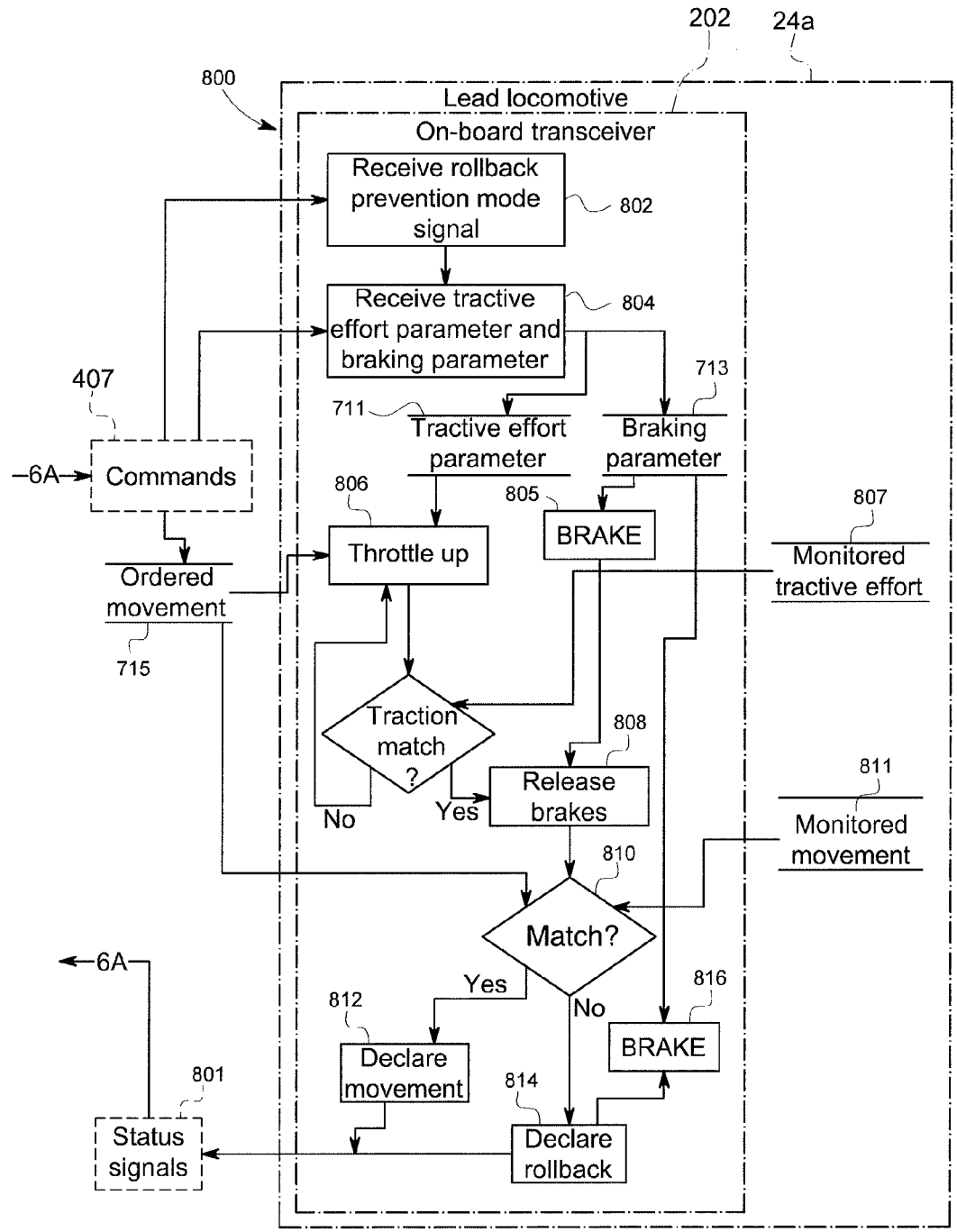

In aspects, the computing device 230 is configured to establish an unwanted movement, e.g., rollback, prevention mode of operation and to execute a first algorithm 700, as shown in FIG. 7A, in response to a first vehicle, e.g., the lead locomotive 24a (or other lead powered rail vehicle), being halted at any location within one or more pre-determined areas of, for example, the rail yard or other unloading operation 10. As part of the first algorithm 700, the computing device 230 directs the on-board transceiver 202 to execute a second algorithm 800, as shown in FIG. 7B. Thus, the two FIGS. 7A and 7B should be considered together.

FIG. 7A shows that at step 702 of the algorithm 700, the computing device 230, within the off-board control unit 204, checks whether a first vehicle, e.g., the lead locomotive 24a (or other lead powered rail vehicle), is stopped. If not, the computing device 230 will exit the algorithm. At step 704, the computing device 230 receives a signal 705 indicative of the location of the first vehicle, e.g., lead locomotive 24a (or other lead powered rail vehicle), and compares the indicated location to a position/movement, e.g., rollback prevention, map or table 706. In case the indicated location is not within the mapped area or is not listed in the table, then the computing device 230 exits the algorithm 700. However, in case the indicated location is mapped on the rollback prevention map 704, or listed in a rollback prevention locations lookup table, then at step 708 the computing device 230 inserts a rollback prevention mode signal into the commands 407. This signal initiates in the on-board transceiver 202 a rollback prevention mode 800, or other unwanted movement mode, as shown in FIG. 7B. Under the rollback prevention mode 800, the on-board transceiver 202 is configured to receive certain additional signals from the off-board control unit 204, as follows.

Still referring to FIG. 7A, at step 710, the computing device 230 accesses the unwanted movement/rollback prevention map 704, or an equivalent lookup table, to find a minimum tractive effort parameter 711 corresponding to the location 501. For example, the minimum tractive effort parameter 711 may be determined during commissioning of the external control system 200. The computing device 230 then inserts into the commands 407 a signal that encodes the minimum tractive effort parameter 711.

At step 712, the computing device 230 accesses the rollback prevention map 704, or an equivalent lookup table, to determine a braking parameter 713 corresponding to the location 501. For example, the braking parameter 713 may be determined during commissioning of the external control system 200. The computing device 230 then inserts into the commands 407 a signal that encodes the braking parameter 715.

At step 714, the computing device 230 receives from the multi-position selector 222 a signal ordering movement of the first vehicle, e.g., lead locomotive 24a (or other lead powered rail vehicle). The computing device 230 generates an ordered movement 715 and forwards a corresponding signal to the on-board transceiver 202. The computing device 230 then proceeds to step 716 of waiting to receive on-board transceiver status signals 801.

Referring to FIG. 7B, at step 802, the on-board transceiver 202 receives the rollback prevention mode signal. At step 804, the on-board transceiver 202 receives the minimum tractive effort parameter 711 and the braking parameter 713. At step 805, the on-board transceiver 202 applies at least the brakes of a first vehicle, e.g., the lead locomotive 24a (or other lead powered rail vehicle), and possibly additional brakes of other vehicles from among a plurality of vehicles, e.g., the rail vehicle consist 20, according to the braking parameter 713. At step 806, the on-board transceiver 202 receives the ordered movement 715 and increments a throttle setting or position ("throttle up") until a monitored tractive effort 807 or other movement measuring parameter matches the minimum tractive effort or movement parameter 711. Then at step 808, the on-board transceiver 202 releases at least the brakes 208 of the lead locomotive 24a (or other lead powered rail vehicle) or other vehicle, as applicable. At step 808, the on-board transceiver 202 also releases any other brakes that are applied, for example, the automatic brakes of the rail vehicle consist 20 in case the rail vehicle consist is in a parked condition. Immediately the on-board transceiver 202 proceeds to step 810 of checking whether the ordered movement 715 corresponds to a monitored movement 811, which includes a direction of motion as well as the measured speed "M" that was discussed with reference to FIG. 4.

In case the monitored movement 811 is matched with the ordered movement 715, then the on-board transceiver 202 declares a "movement" status signal at step 812. In case the monitored movement 811 does not match the ordered movement 715, then at step 814 the on-board transceiver 202 declares a "rollback" or "unwanted movement" status signal and proceeds to apply automatic and independent brakes ("emergency braking") at step 816.

In some embodiments, step 810 of checking for a match is accomplished by instantaneous or "snapshot" comparison of the directions of measured movement 811 and ordered movement 715. Thus, for example, in case the speed of ordered movement 715 is +0.5 mph (+0.2 m/s), while the monitored movement 811 is −0.2 mph (−0.09 m/s) (directions do not match), then a rollback is declared.

Figure 7C:
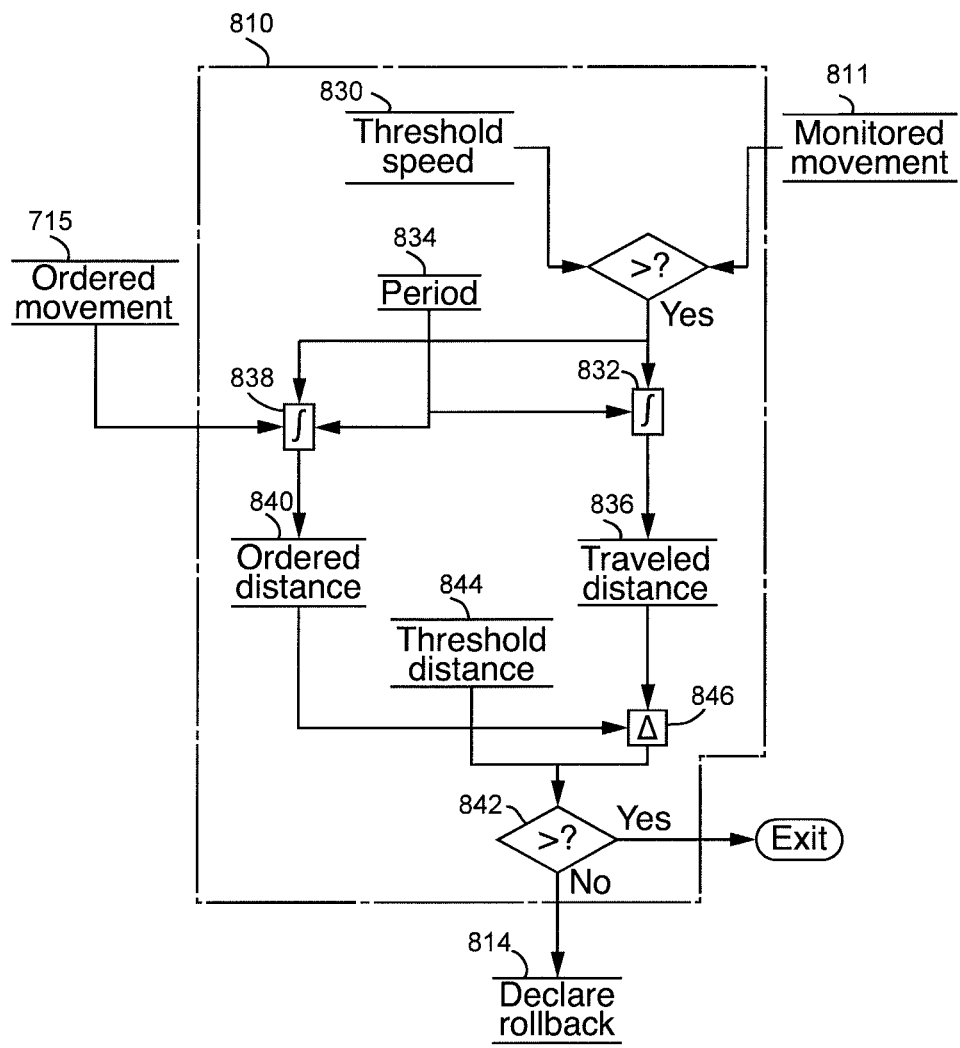

In other embodiments, step 810 is accomplished in a first noise-managed mode by comparing ordered movement 715 to monitored speed and direction 811 on a time integral basis, using one or more threshold value criteria. That is, referring to FIG. 7C, monitored movement 811 is continually compared to a first threshold value 630. In case the first threshold value is exceeded, at step 632 the monitored movement 811 is integrated over a pre-determined period 834 to produce a cumulative traveled distance 836, while at step 838 the ordered movement is integrated over the same period to produce a cumulative ordered distance 840. Then at step 842 a second threshold value 844 is compared to the cumulative traveled distance 836, or to a difference 846 between the cumulative traveled distance and the cumulative ordered distance 840. For example, the first threshold value 830 may be as small as −0.02 mph (0.009 m/s), the pre-determined period 634 may be 10 seconds, while the second threshold value 844 may be as large as 33 ft (10 m). The threshold values 830, 844, and the time period 834, are configurable at least at commissioning of the external control system e.g., the external control system 200.

Referring back to FIG. 7A, in case the signal received at step 716 indicates proper movement, the computing device 230 exits the algorithm 700. On the other hand, in case the signal received at step 716 indicates rollback or unwanted movement, the computing device 230 performs step 718 of displaying an alert.

Figure 8:
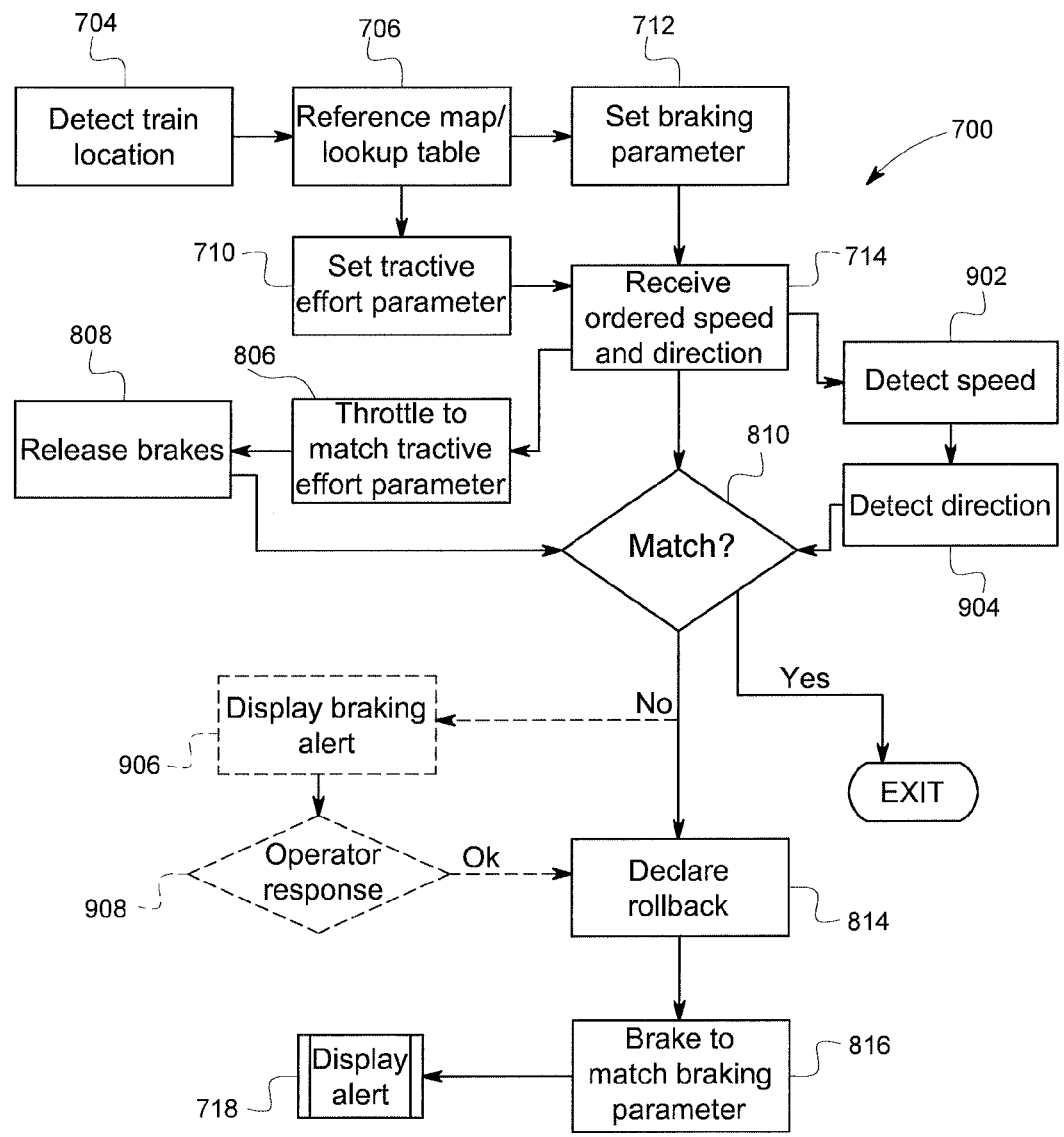
FIG. 8 shows in schematic view a rollback prevention mode of the external control system, according to other aspects of the invention.

FIG. 8 shows more generally the algorithms 700 and 800, including additional steps 702, 704 of monitoring speed and direction of the rail vehicle consist 20 as well as optional steps 706, 708 of displaying a braking alert and awaiting an operator response or confirmation, prior to step 814 of declaring rollback.

Figure 9A:
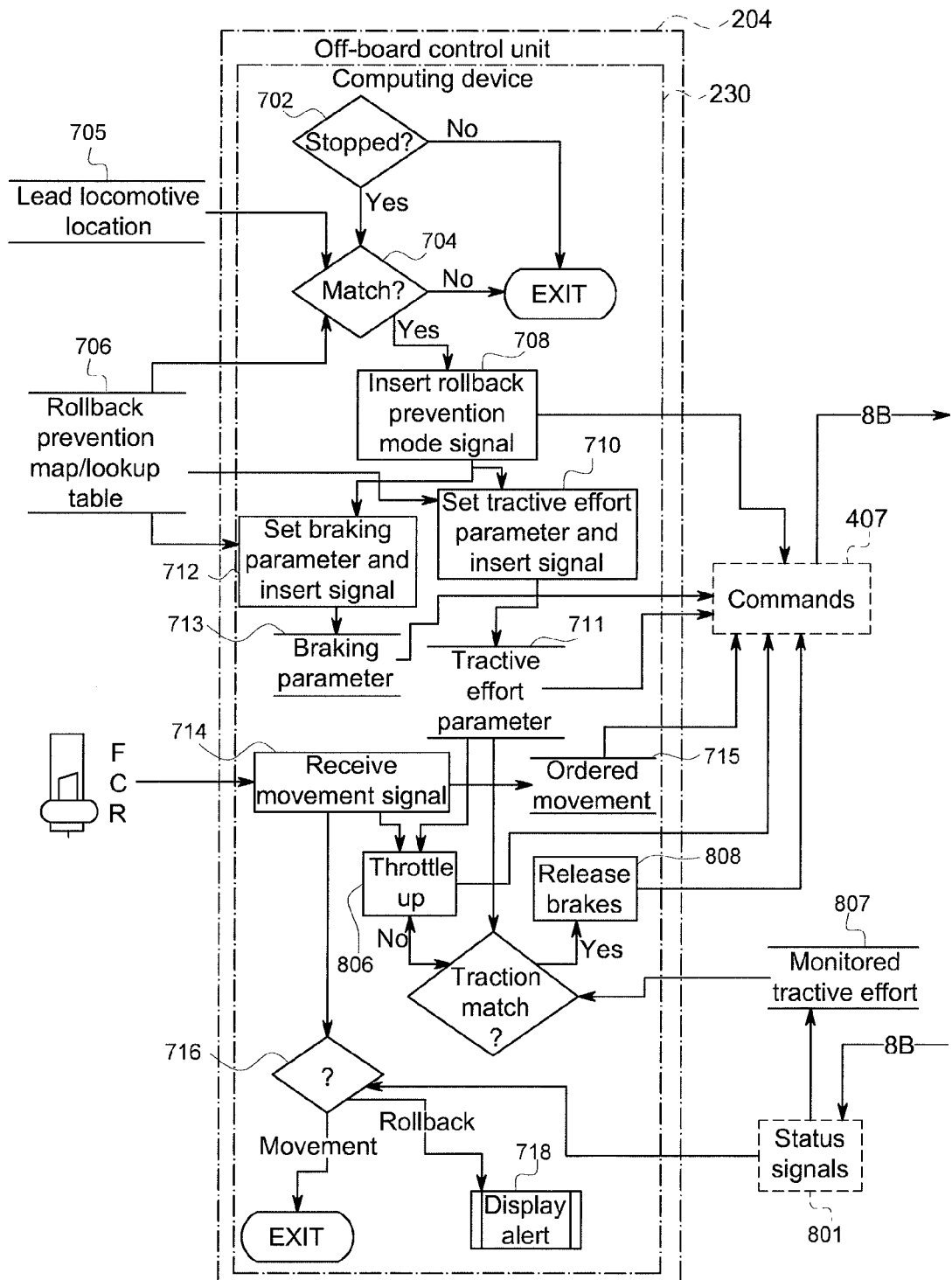
FIGS. 9A-9B show in schematic view another rollback prevention mode of the external control system, according to other aspects of the invention.
Figure 9B:
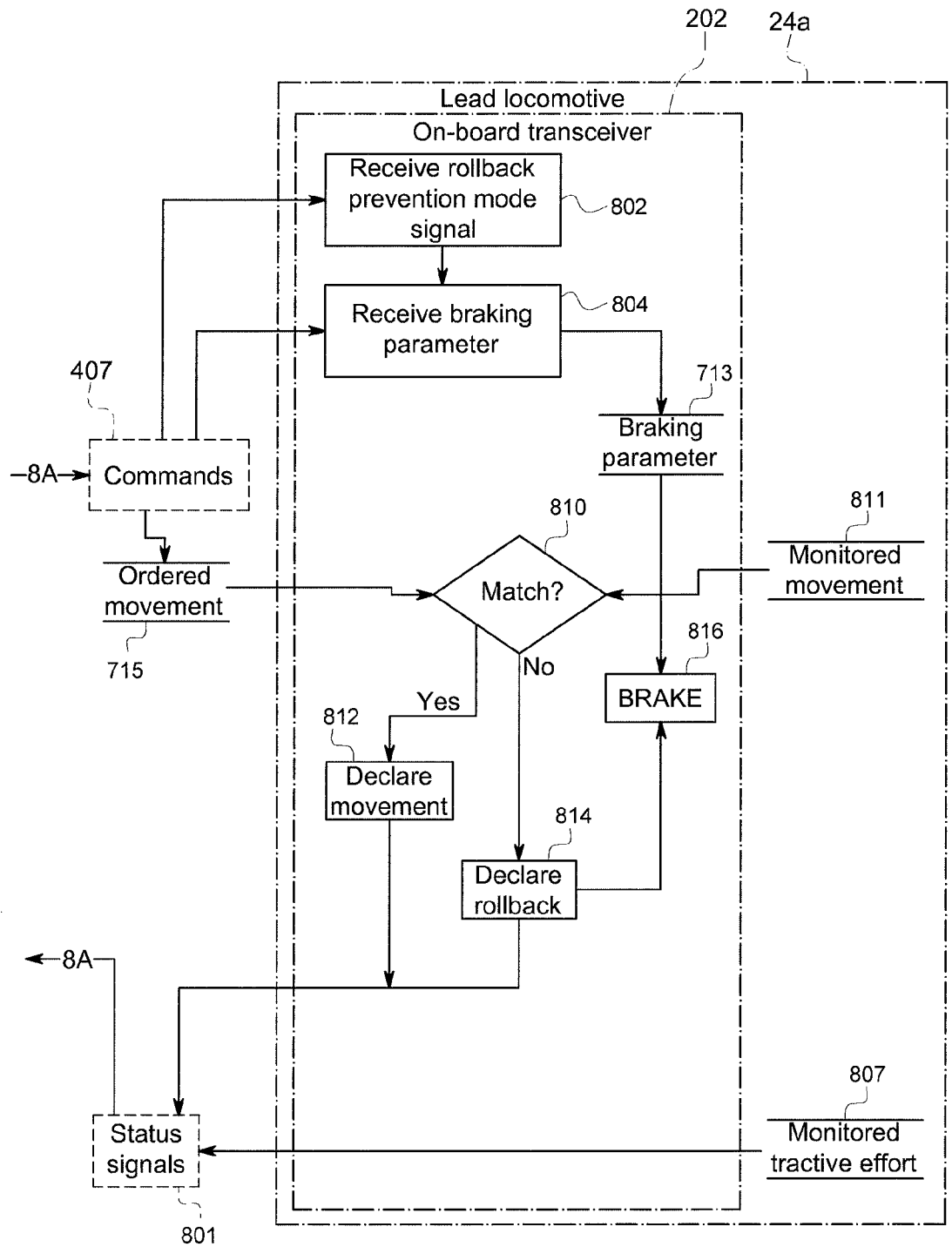

FIGS. 9A-9B show another implementation of the algorithms 700, 800, wherein certain steps are performed in the computing device 230, rather than at the on-board transceiver 202. In particular, FIG. 9A shows that step 806 (throttling up to match the monitored tractive effort 807 to the minimum tractive effort parameter 711) and step 808 (releasing brakes) can be accomplished by remote commands from the off-board control unit 204, rather than autonomously by the on-board transceiver 202. Meanwhile FIG. 9B shows that the function of step 810 (comparing ordered movement to monitored movement) still can be accomplished by the on-board transceiver 202 using sensors aboard the rail vehicle 24a or other vehicle.

As will be readily appreciated, in aspects of the present invention, an external control system operator is given direct control over the tractive effort exerted by a powered vehicle of a vehicle consist, during positioning of the vehicle consist for bulk unloading. As a result, the vehicle consist can be smoothly and quickly aligned by an experienced operator to a desired position where the vehicle consist will not impact or rest against unloading equipment. Thus, risks of damage or improper operation are reduced.

In aspects, a method for remotely controlling a plurality of vehicles includes receiving at an external control system, under an indexing mode of operation, a first signal from off-board vehicle indexing equipment; in response to the first signal, establishing in the external control system a positioning mode of operation. The method further includes, under the positioning mode of operation, and in response to actuation of an interface of the external control system, sending from the external control system a second signal to a first vehicle of the plurality of vehicles, the second signal comprising a first command to adjust a throttle setting of first vehicle and a second command to idle a throttle of at least one second vehicle of the plurality of vehicles. In embodiments, establishing the positioning mode of operation includes preliminary steps of verifying the indexing mode of operation and verifying an idle condition, such that the positioning mode of operation will not be established if one or more of the indexing mode of operation and the idle condition is not verified. In certain embodiments, verifying the idle condition includes verifying an IDLE status of an interface of the external control system. Establishing the positioning mode of operation may include updating a display of the external control system to indicate a throttle setting and, in certain aspects, includes setting in the external control system a maximum limit for adjusting the throttle setting of the first vehicle. In certain embodiments, the first command is a command to idle the throttle of the first vehicle. The second signal includes a third command to release brakes of the first vehicle. Exiting the positioning mode of operation is accomplished by re-establishing the indexing mode of operation while sending a third signal from the external control system to the first vehicle, said third signal including a fifth command to idle the throttle of said first vehicle and a sixth command to apply independent brakes of first vehicle. In embodiments, exiting the positioning mode of operation is done responsive to one or more of: actuation of a RUN mode device of the tower control system to a CENTER position; or at least one of actuation of a STOP button or of a PARK button of the tower control system. In an embodiment, exiting the positioning mode of operation includes maintaining a current throttle setting of the first vehicle, incrementally increasing a braking pressure of the first vehicle until a braking parameter is met and idling the throttle of the first vehicle.

In an embodiment, a system for controlling a vehicle includes an off-board control unit configured for communication with an on-board transceiver, which is mounted in the vehicle and operatively connected with at least one power system of the vehicle, said off-board control unit further configured for receiving a first signal from off-board vehicle sensing equipment disposed proximate the first vehicle; and an operator control unit operatively connected with the off-board control unit and including a selector manually movable to a plurality of pre-determined positions, such that in response at least to movement of the selector among the pre-determined positions, the off-board control unit is configured to establish corresponding modes of operation, wherein the off-board control unit is configured to establish a positioning mode of operation, corresponding to one of the pre-determined positions of the selector, in response to the first signal received from the off-board vehicle sensing equipment, and wherein when operating in the positioning mode of operation the off-board control unit is configured to transmit to the onboard transceiver second signals for positioning the vehicle independently from a plurality of vehicles of which the first vehicle is in proximity to. The second signals may include a signal for setting a throttle control of the first vehicle or for adjusting a braking parameter of the first vehicle. The off-board control unit is configured to generate the signal for adjusting the braking parameter based on comparison of a location of the first vehicle to a lookup table that indexes braking parameter values by locations within an area where the first vehicle is present. The second signals include a signal for overriding a distributed power configuration of the plurality of vehicles and may include a signal for idling throttles of vehicles in the plurality of vehicles that the off-board control unit controls via the on-board transceiver. The second signals comprise a signal for releasing brakes of vehicles in the plurality of vehicles that the off-board control unit controls via the on-board transceiver. The off-board vehicle sensing equipment comprises indexing equipment configured to adjust a position of the first vehicle and to send to the off-board control unit the first signal indicating the first vehicle is ready for the off-board control unit to establish the positioning mode of operation. In embodiments, the off-board control unit is further configured to exit from the positioning mode of operation in response to the selector being moved to a neutral or IDLE position. The off-board control unit may be further configured to exit from the positioning mode of operation by maintaining a current throttle setting of the first vehicle, ordering a braking pressure of the first vehicle to match a pre-determined braking. Parameter and idling the throttle of the first vehicle. In aspects, the braking parameter is set based on comparison of a location of the first vehicle to a lookup table indexing braking parameter values by locations within the location where the first vehicle is located.

In an embodiment, a system for remotely controlling a plurality of vehicles includes an off-board control system configured for communication with the plurality of vehicles and to receive a first signal from vehicle environment equipment, the off-board control system comprising an interface.

The off-board control system is configured to transition from an indexing mode of operation to a positioning mode of operation responsive to receiving the first signal, and the off-board control system, when operative in the positioning mode of operation and in response to actuation of the interface, is configured to send from the off-board control system a second signal to a first vehicle of plurality of vehicles, said second signal comprising a first command to adjust a throttle setting of the first vehicle and a second command to idle a throttle of any other vehicle of the plurality of vehicles.

In an aspect, a system for controlling a vehicle includes an on-board transceiver mounted in said vehicle and operatively connected with at least one power system of the vehicle, said on board transceiver configured to receive from an off-board control unit, not mounted in said vehicle, command signals for positioning the vehicle independently from a plurality of vehicles that the first vehicle is proximate to, said command signals comprising a signal for setting a throttle control of the vehicle, a signal for adjusting a braking parameter of the vehicle, and a signal for discontinuing a distributed power control mode of the vehicle.

In aspects, a method, e.g., a method for preventing unwanted movement of a vehicle from a stopped condition, includes receiving a first signal indicative of the vehicle's location and, in response to the first signal, selecting from a lookup table one of a first plurality of pre-determined values of a braking parameter and selecting from the lookup table one of a second plurality of pre-determined values of a tractive effort parameter. The method then includes transmitting to the vehicle a second signal ordering movement of the vehicle from the stopped condition. The second signal includes the selected value of the braking parameter for controlling application of brakes of the vehicle and the selected value of the tractive effort parameter for establishing tractive effort of the vehicle. In some aspects, the method also includes receiving the second signal at the vehicle, and, in response to the second signal, applying the brakes of the vehicle, according to the selected value of the braking parameter; establishing the tractive effort of the vehicle, according to the selected value of the tractive effort parameter; and, releasing the brakes of the vehicle to establish movement of the vehicle from the stopped condition. In certain aspects, the first signal is received at an off-board control unit that is not installed on the vehicle. In select aspects, the second signal is transmitted from the off-board control unit to an on-board transceiver that is installed on the vehicle.

Embodiments include a system for controlling a vehicle, which includes an on-board transceiver mounted in the vehicle and operatively connected with at least one traction motor and at least one brake of the vehicle. The on-board transceiver is configured to receive from an off-board control unit a first signal for establishing a rollback prevention mode. In its rollback prevention mode, the on-board transceiver is configured to receive from the off-board control unit a second signal indicative of a required tractive effort and a third signal indicative of a required braking force, and to control maintaining the required braking force until attaining the required tractive effort. The on-board transceiver may be further configured to control release of the braking force on attaining the required tractive effort, to monitor movement of the vehicle, to compare the monitored movement to an ordered movement, and to control application of the required braking force according to the third signal, in case the monitored movement does not match the ordered movement. In certain embodiments, the on-board transceiver may be configured to compare the monitored movement to the ordered movement on a time integral basis.

In other embodiments, a system for controlling a vehicle includes an off-board control unit that is not mounted in the vehicle and an on-board transceiver that is mounted in the vehicle. The off-board control unit is configured to receive a first signal indicative of a location of the vehicle and to send, in response to the first signal, a second signal indicative of a minimum tractive effort parameter and a third signal indicative of a braking parameter. The on-board transceiver is operatively connected with at least one traction motor and at least one brake of the vehicle, and is configured to receive the second and third signals from the off-board control unit. The on-board transceiver is further configured to control maintaining the brake output at or above a level of the braking parameter until the traction motor output at least matches a level of the minimum tractive effort parameter.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §122, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Since certain changes may be made in the above-described embodiments, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A method for remotely controlling a plurality of vehicles, said method comprising:
receiving at an external control system, under an indexing mode of operation, a first signal from off-board vehicle indexing equipment;
in response to the first signal, establishing in the external control system a positioning mode of operation; and,
under the positioning mode of operation, and in response to actuation of an interface of the external control system, sending from the external control system a second signal to a first vehicle of the plurality of vehicles, the second signal comprising a first command to adjust a throttle setting of first vehicle and a second command to idle a throttle of at least one second vehicle of the plurality of vehicles.

2. The method of claim 1, wherein establishing the positioning mode of operation includes preliminary steps of verifying the indexing mode of operation and verifying an idle condition, such that the positioning mode of operation will not be established if one or more of the indexing mode of operation and the idle condition is not verified.

3. The method of claim 2, wherein verifying the idle condition includes verifying an idle status of an interface of the external control system.

4. The method of claim 1, wherein establishing the positioning mode of operation includes updating a display of the external control system to indicate the throttle setting.

5. The method of claim 1, wherein establishing the positioning mode of operation includes setting in the external control system a maximum limit for adjusting the throttle setting of the first vehicle.

6. The method of claim 1, wherein the first command is to adjust the throttle setting of the first vehicle to idle.

7. The method of claim 1, wherein the second signal includes a third command to release brakes of the first vehicle.

8. The method of claim 1, further comprising, exiting the positioning mode of operation by re-establishing the indexing mode of operation while sending a third signal from the external control system to the first vehicle, said third signal including a fifth command to adjust the throttle setting of the first vehicle to idle and a sixth command to apply independent brakes of the first vehicle.

9. The method of claim 8, wherein exiting the positioning mode of operation is done responsive to one or more of: actuation of a RUN mode device of the external control system to a CENTER position; or at least one of actuation of a STOP button or of a PARK button of the external control system.

10. The method of claim 8, wherein exiting the positioning mode of operation comprises:
maintaining a current throttle setting of the first vehicle;
incrementally increasing a braking pressure of the first vehicle until a braking parameter is met; and
adjusting the throttle setting of the first vehicle to idle.

11. A control system comprising:
an off-board control unit configured for communication with an on-board transceiver that is mounted in a vehicle and operatively connected with at least one power system of the vehicle, said off-board control unit further configured for receiving a first signal from off-board vehicle sensing equipment disposed proximate the vehicle; and
an operator control unit operatively connected with the off-board control unit and including a selector manually movable to a plurality of pre-determined positions, such that in response at least to movement of the selector among the pre-determined positions, the off-board control unit is configured to establish corresponding modes of operation, wherein the off-board control unit is configured to establish a positioning mode of operation, corresponding to one of the pre-determined positions of the selector, in response to the first signal received from the off-board vehicle sensing equipment, and wherein when operating in the positioning mode of operation the off-board control unit is configured to transmit to the on-board transceiver second signals for positioning the vehicle independently from a plurality of vehicles of which the first vehicle is in proximity to.

12. The system of claim 11, wherein the second signals comprise a signal for setting a throttle control of the vehicle.

13. The system of claim 11, wherein the second signals comprise a signal for adjusting a braking parameter of the vehicle.

14. The system of claim 13, wherein the off-board control unit is configured to generate the signal for adjusting the braking parameter based on comparison of a location of the vehicle to a lookup table that indexes braking parameter values by locations within an area where the first vehicle is present.

15. The system of claim 11, wherein the second signals comprise a signal for overriding a distributed power configuration of the plurality of vehicles.

16. The system of claim 11, wherein the second signals comprise a signal for idling throttles of vehicles in the plurality of vehicles that the off-board control unit controls via the on-board transceiver.

17. The system of claim 11, wherein the second signals comprise a signal for releasing brakes of vehicles in the plurality of vehicles that the off-board control unit controls via the on-board transceiver.

18. The system of claim 11, wherein the off-board vehicle sensing equipment comprises indexing equipment configured to adjust a position of the vehicle and to send to the off-board control unit the first signal indicating the vehicle is ready for the off-board control unit to establish the positioning mode of operation.

19. The system of claim 11, wherein the off-board control unit is further configured to exit from the positioning mode of operation in response to the selector being moved to a neutral or idle position.

20. The system of claim 19, wherein the off-board control unit is further configured to exit from the positioning mode of operation by:
maintaining a current throttle setting of a throttle of the vehicle;
ordering a braking pressure of the vehicle to match a determined braking parameter; and
idling the throttle of the vehicle.

21. The system of claim 20, wherein the braking parameter is set based on comparison of a location of the vehicle to a lookup table indexing braking parameter values by locations within the area where the vehicle is located.

22. A control system comprising:
an off-board control system configured for communication with a plurality of vehicles and to receive a first signal from vehicle environment equipment, the off-board control system comprising an interface; and wherein the off-board control system is configured to transition from an indexing mode of operation to a positioning mode of operation responsive to receiving the first signal, and wherein the off-board control system, when operative in the positioning mode of operation and in response to actuation of the interface, is configured to send from the off-board control system a second signal to a first vehicle of plurality of vehicles, said second signal comprising a first command to adjust a throttle setting of the first vehicle and a second command to idle a throttle of any other vehicle of the plurality of vehicles.

23. A control system comprising:

an on-board transceiver mounted in a vehicle and operatively connected with at least one power system of the vehicle, said on-board transceiver configured to receive from an off-board control unit, not mounted in said vehicle or in any of a plurality of vehicles within a rail vehicle consist that includes the vehicle, command signals for positioning the vehicle independently from the plurality of vehicles, said command signals comprising a signal for setting a throttle control of the vehicle, a signal for adjusting a braking parameter of the vehicle, and a signal for discontinuing any and all distributed power control modes of the vehicle.

* * * * *